(12) United States Patent
Strutt et al.

(10) Patent No.: US 7,512,074 B2
(45) Date of Patent: Mar. 31, 2009

(54) SYSTEM AND METHOD TO SCOUT FOR ROUTES IN A WIRELESS NETWORK

(75) Inventors: Guenael T. Strutt, Sanford, FL (US); Avinash Joshi, Orlando, FL (US)

(73) Assignee: Motorola, Inc., Schaumburg, IL (US)

( * ) Notice: Subject to any disclaimer, the term of this patent is extended or adjusted under 35 U.S.C. 154(b) by 637 days.

(21) Appl. No.: 10/986,698

(22) Filed: Nov. 12, 2004

(65) Prior Publication Data
US 2006/0104205 A1    May 18, 2006

(51) Int. Cl.
H04L 12/26    (2006.01)
(52) U.S. Cl. .................................. 370/238; 370/338
(58) Field of Classification Search .................. None
See application file for complete search history.

(56) References Cited

U.S. PATENT DOCUMENTS

| | | | |
|---|---|---|---|
| 5,442,624 A * | 8/1995 | Bonomi et al. | 370/231 |
| 6,381,228 B1 * | 4/2002 | Prieto et al. | 370/323 |
| 6,731,628 B1 * | 5/2004 | Shiomoto et al. | 370/355 |
| 6,807,165 B2 | 10/2004 | Belcea | |
| 6,873,839 B2 | 3/2005 | Stanforth | |
| 6,940,832 B2 | 9/2005 | Saadawi et al. | |
| 2001/0036810 A1 | 11/2001 | Larsen | |
| 2002/0051425 A1 | 5/2002 | Larsson | |
| 2002/0058502 A1 | 5/2002 | Stanforth | |
| 2003/0118051 A1 * | 6/2003 | Ooms | 370/471 |
| 2003/0179718 A1 | 9/2003 | Ebata et al. | |
| 2003/0204587 A1 | 10/2003 | Billhartz | |
| 2004/0022223 A1 | 2/2004 | Billhartz | |
| 2004/0114569 A1 | 6/2004 | Naden et al. | |
| 2004/0143842 A1 | 7/2004 | Joshi | |
| 2004/0156345 A1 | 8/2004 | Steer et al. | |
| 2004/0203820 A1 * | 10/2004 | Billhartz | 455/452.1 |
| 2005/0135330 A1 * | 6/2005 | Smith et al. | 370/351 |

OTHER PUBLICATIONS

D.B. Johnson, D.A. Maltz, "Dynamic Source Routing in Ad Hoc Wireless Networks," in Mobile Computing, Editors T. Imielinsi & H. Korth, Kluwer Academic Publishers, 1996.

(Continued)

*Primary Examiner*—Firmin Backer
*Assistant Examiner*—Rhonda Murphy
(74) *Attorney, Agent, or Firm*—Randi L. Karpinia; Joe Buczynski

(57) ABSTRACT

The present invention provides a system and method for evaluating the performance of a potential route before it is actually established. In a wireless network, when a trigger is received by a source node that suggests the existence of a better route, the source node sends a scouting packet along the suggested route. The scouting packet collects statistics related to the suggested route, without establishing the route while the scouting packet traverses the route. The metric for the suggested route, which is derived from the statistics collected by the scouting packet, is compared to the metric for the current route. If the metric for the suggested route is preferable to that of the current route, the suggested route is established as a new route.

17 Claims, 2 Drawing Sheets

OTHER PUBLICATIONS

M.K. Marina, S.R. Das, "On-Demand Multipath Distance Vector Routing in Ad Hoc Networks," Proceedings of IEEE ICNP, Nov. 2001.

D. De Couto, D. Aguayo, J. Bicket, R. Morris, "A High-Throughput Path Metric for Multi-Hop Wireless Routing," MIT Computer Science and Artifical Intelligence Laboratory, Sep. 2003.

M. Hicks, J. Moore, D. Alexander, C. Gunter, S. Nettles, "PLANet: An Active Internetwork," Department of Computer and Information Science, University of Pennsylvania, Mar. 1999.

S. Lee, S. Banerjee, B. Bhattacharjee, "The Case for a Multi-Hop Wireless Local Area Network", Mar. 2004.

M. Just, E. Kranakis, T. Wan, "Resisting Malicious Packet Dropping in Wireless Ad Hoc Networks", Oct. 2003.

* cited by examiner

SYSTEM AND METHOD TO SCOUT FOR ROUTES IN A WIRELESS NETWORK

BACKGROUND OF THE INVENTION

1. Field of the Invention

The present invention relates to a system and method for evaluating the performance of a potential route before it is actually established.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, in U.S. Pat. No. 6,807,165 "Time Division Protocol for an Ad-Hoc, Peer-to-Peer Radio Network Having Coordinating Channel Access to Shared Parallel Data Channels with Separate Reservation Channel", issued on Oct. 19, 2004, and in U.S. Pat. No. 6,873,839 entitled "Prioritized-Routing for an Ad-Hoc, Peer-to-Peer, Mobile Radio Access System", issued on Mar. 29, 2005, the entire content of each being incorporated herein by reference.

A node in a wireless network usually sends data to another node by establishing a route to that other node. Sometimes a third node will act as a proxy. In order to maximize the performance of the network (i.e. maximize the amount of traffic that each node is capable of carrying across the network), routes are typically established by minimizing or maximizing a cost function; the "route metric". This metric can be based on a variety of parameters, such as the number of hops, the signal strength, the signal-to-noise ratio (SNR), the congestion, the battery power, the packet completion rate, the data rate, the queue size, the packet size, the type of traffic or other metrics. However, some of the most valuable metrics (such as the completion rate and the data rate) are impossible to establish with precision unless some traffic is being sent on each link. Since generating traffic on each link is a waste of bandwidth (and therefore a hindrance to maximizing performance), there is a need for a more suitable way of determining the route metric without generating an unnecessarily large amount of traffic.

Routing algorithms circumvent this problem by making a rough (and therefore, wholly inaccurate) estimation based on statistics collected passively, for example, by listening to beacons or control traffic. The statistics that are collected passively present a series of problems. First of all, these statistics may become stale if the nodes in the wireless network are highly mobile. Secondly, statistics that are collected passively are very imprecise compared to statistics that are collected when active traffic is being sent between two nodes of a wireless network. For these reasons, the route metrics that are derived from statistics collected passively may induce the routing algorithm to select an unusable route. There is therefore a need for a protocol that makes more informed decisions before the establishment of a route. Currently known methods to search for routes in a wireless network include the establishment of a new route based on a priori information. One example of this method is described in U.S. Patent Application No. 2004/0143842 ("System and method for achieving continuous connectivity to an access point or gateway in a wireless network following an on-demand routing protocol, and to perform smooth handoff of mobile terminals between fixed terminals in the network").

In the method described in the above referenced application, if a node receives a hello message suggesting a better route to the access point, this node will immediately switch routes. After the establishment of the new route, traffic may be sent along the route. It is possible that the route metric that is determined as the route is being used to send traffic ends up being considerably worse than the route metric that was determined using the statistics collected passively. The update route metric could be so much worse as to trigger the re-establishment of the previously abandoned route. It is therefore desirable to have a system that ensures that the new offered route is indeed better than the previously used one before a new route is established.

Other methods to search for routes in a wireless network involve the maintenance of multiple routes. Some on demand routing protocols like Dynamic Source Routing (DSR) and Ad-hoc On-demand Multipath Distance Vector (AOMDV) routing maintain multiple routes to a destination. A node can either use multiple routes simultaneously or can just use one route and switch immediately to the other if the current route breaks. The simultaneous use of routes can cause problems due to the out-of-order delivery of packets and hence the other use of multiple routes is preferred. Although alternate routes are valid routes at the time of creation, as time goes by they may become stale or have worse metrics. It would be desirable to have a method that prevents alternate routes from becoming stale.

Another method to search for routes in a wireless network involves the estimation of the route metric based on the transmission of data packets. This method requires the transmission of periodic data packets or beacons and then estimating the quality based on the receive statistics. This can provide an accurate estimation but only after incurring high overhead. It would be desirable to have a method that limits the extra amount of overhead.

Other algorithms have been devised to improve network performance by performing actions akin to scouting. In one such algorithm ("PLANet: an active internetwork"), presented by Michael Hicks et al., the authors write "However, we will periodically intersperse scout packets that will explore the network searching for a better route and directing the flow of the transport packets. Each scout packet fits within a 1500 byte Ethernet frame, yet carries out some non-trivial computations. In particular, at each hop, the scout packet will send a copy of itself on each of the router's outgoing interfaces, thus fanning out over the network." Because of the dissemination of the scout packet all across the network, the use of PLANet is restricted to wired networks. There is therefore a need for a method to scout for routes in a wireless network while limiting the amount of signaling overhead.

Another algorithm that uses a method akin to scouting is presented in U.S. Pat. No. 6,798,765 ("Method for forwarding in multihop networks"), issued on Sep. 28, 2004. The application describes a "method for forwarding information in a multihop network comprising a plurality of nodes, comprising the steps of: designating a node in the network as an originating node; transmitting a probe message from the originating node in the network to a plurality of other nodes in the network in a general direction in which the information is to be forwarded". However, each probe is limited to an individual hop. There is therefore a need for a method to scout for routes across a plurality of hops in a wireless network.

SUMMARY OF THE INVENTION

The present invention provides a system and method for evaluating the performance of a potential route before it is actually established. In a wireless network, when a trigger is received by a source node that suggests the existence of a better route, the source node sends a scouting packet along the suggested route. The scouting packet collects statistics related to the suggested route, without establishing the route while the scouting packet traverses the route. The metric for the suggested route, which is derived from the statistics collected by the scouting packet, is compared to the metric for the current route. If the metric for the suggested route is preferable to that of the current route, the suggested route is established as a new route.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
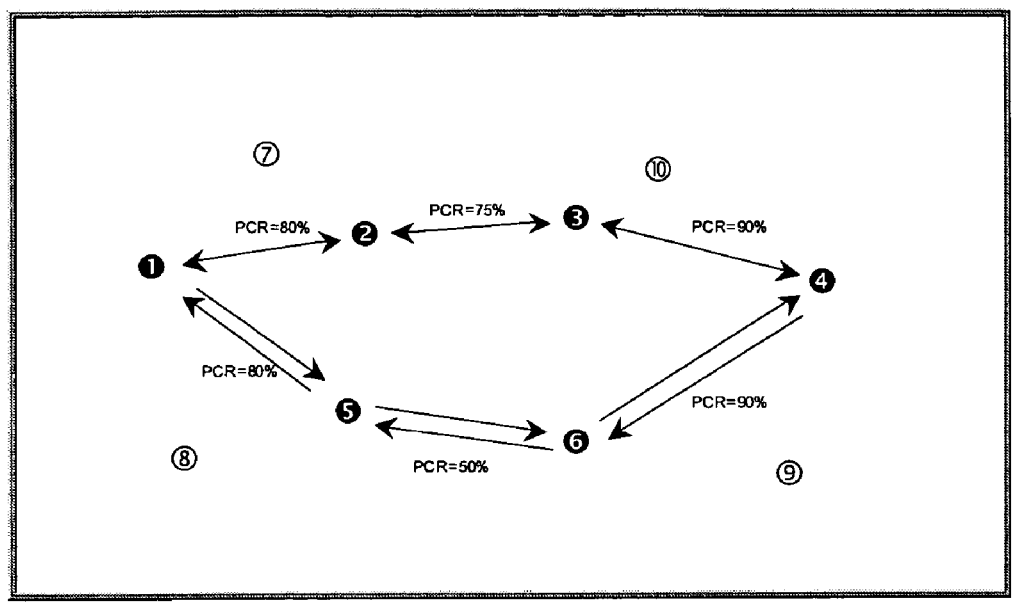
FIG. 1 is a block diagram of an example of a wireless network.

The purpose of this invention is to alleviate the problem associated with the metric estimation procedure by providing a better estimate of the link quality based on the collection of specific statistics. The mechanism described herein is analogous to real-world scouting—the scout travels alone or in a small group to explore the terrain, then reports to the base, which in turns makes a decision based on the information collected by the scout(s). While scouting, scouts don't engage in the activity for which the area is being scouted (establishing a camp, combat, etc.); likewise, it is not the purpose of network scouting to establish routes, only to analyze them.

Scouting Process

The procedural differences between a traditional routing algorithm and a routing algorithm using scouting to determine routes are summarized in the following table:

TABLE 1

Scouting procedure

| ROUTING ALGORITHM | vs. | SCOUTING ALGORITHM |
| --- | --- | --- |
| Establish a route | | Establish a route |
| (optional) Monitor the current route for changes | | (optional) Monitor the current route for changes |
| Event: trigger for establishment of new route (the event may be the failure of a link or the reception of a suggestion) | | Event: trigger for establishment of new route Scout the new route first If necessary, repeat the scouting process Compare the new route statistics to the old route |
| Establish a new route to the destination | | If the statistics are better, establish the new route |

There are multiple situations in which a routing algorithm may need scouting:
1. Multiple-route protocol. In case of a routing protocol which computes multiple routes, there is a need for sending scouting packets periodically to ensure that all routes are still valid.
2. Routing metric precision. If a node is not confident about the precision of its metric to a neighbor because no communication has taken place recently, there is a need for sending a number of dummy scouting packets to update the metric.
3. Time dependency. A system in which a route can only be reliably established if time-slots are available may need a method to ensure that there are enough slots available along the route before any hand-off occurs.

All those cases are especially true in mobile scenarios where handoffs occur. This scenario, plus the three above, are described below.

Multiple-route Protocol

As referenced above, the DSR and AOMDV routing protocols maintain multiple routes to a single destination. Quite often only a single route is used in these protocols while the other routes are kept as backup routes. There is a good possibility that as time passes the other backup routes become stale or offer a worse metric than what was originally computed. To avoid this occurrence, the Scouting Packets should be sent along the unused routes at a periodic interval. The number of backup routes which should be "scouted" this way and the periodic interval should be based on the history of change in route metrics along all the routes maintained by the node as well as the mobility of the node. For example, if the node is stationary, the periodic interval can be decreased.

The Scouting Packet can take the form of a DSR RREQ (Route Request) packet or an AODV RREQ packet with some special bit set that differentiates it from regular routing packets. The Scouting Packet can also be a separate packet with the following fields (this list is not exhaustive):

Packet Type: Scouting Packet

Source Address: MAC or IP address of the source depending on the routing protocol Destination Address: MAC or IP address of the destination depending on the routing protocol List of Addresses of Intermediate nodes Cumulative Metrics Routing Metric Precision In addition to calculating a metric for each route, it is possible that a routing algorithm determine a metric precision (i.e. the metric M can be expressed as $M=\mu_M \pm p_M$), where $\mu_M$ is the metric average and $p_M$ is the metric error. Therefore, the scouting packet can either report the actual metric along with its precision, report the minimum possible metric, or report an estimation of the metric. For example, if the metric consists of a packet completion rate, the scouting packet can keep track of the number of retries, and derive a packet completion rate with a (limited) degree of precision. This degree of precision is discussed below.

Two approaches are possible. (1) The metric is precision-aware. Scouting will update the metric and increase its precision. If the precision is still not good enough at the end of scouting to be assured that the new route is better, another scouting packet is sent. As dummy traffic is being generated by the scouting packets, the error $p_M$ decreases and the source node can better evaluate the quality of the route. (2) The metric is traffic-aware. Scouting uses the actual metric for used links but substitutes its own metric for unused links, based on statistics collected during scouting. An example is given below.

Consider a network with 10 nodes (shown in FIG. 1), where node ❶'s objective is to maintain a stable route to node ❿. The completion rates given in this example are arbitrary and they have been selected only to illustrate the purpose of the scouting algorithm.

A simple yet effective metric to select a route in a wireless network is the number of required transmissions. Extra transmissions increase channel usage and add to latency—two primordial factors in reducing the performance of a packet-switched wireless network. It is therefore reasonable to assume that performance will increase as the metric decreases. The number of required transmissions will decrease as the number of hops decreases and the packet completion rate of each link increases. There is therefore a balance to be found between favoring a reduced number of hops and favoring high completion rates.

The metric used in the example is defined using the following parameters:

H=total number of hops
h=hop number
PCR(h)=packet completion rate at hop h
r(h)=number of retries at hop h
$\mu_{r(h)}$=average number of retries at hop h
R=total number of round-trip retries
$\mu_R$=average number of round-trip retries
M=routing metric (average number of transmissions)

From those parameters the following equations can be established (assuming that the transmission success probability has a geometric distribution):

$$\mu_{r(h)} = \left(\frac{1}{PCR(h)} - 1\right) \quad (1)$$

$$\mu_R = 2 \cdot \sum_{h=1}^{H} \left(\frac{1}{PCR(h)} - 1\right) \quad (2)$$

$$M = H + \frac{\mu_R}{2} = H + \sum_{h=1}^{H}\left(\frac{1}{PCR(h)} - 1\right) = \sum_{h=1}^{H}\left(\frac{1}{PCR(h)}\right) \quad (3)$$

$$P[r(h)<k] = 1 - (1-PCR(h))^k \quad (4)$$

$$P[r(h)=k] = (1-PCR(h))^k \cdot PCR(h) \quad (5)$$

where P[x] is the probability of "x".

In regards to the metric used in the example above, the raw number of transmissions is of significance only if one considers that all packets occupy the same airtime. This means that one has to make the following assumptions: (i) all packets have the same length, (ii) all packets use the same data rate and (iii) there is no slowdown mechanism. Furthermore, congestion at certain locations in the network may adversely slowdown the rate of transmission of information in spite of a reasonable number of required transmissions. In this situation, the metric chosen presents limited benefits. The simple metric M is used only to illustrate the purpose of a scouting packet in a wireless packet-switched network.

Now, let us assume at first that node ❶ has established a route to node ❹ via nodes ❷ and ❸. Let us also assume that node ❺ has informed node ❶ of an alternate route to node ❹ with a potentially better metric. Both routes have three hops (H=3). The performance parameters (which are chosen arbitrarily for illustrative purposes) are given in the following table:

TABLE 2

|  | First hop | | Second hop | | Third hop | | Entire route | | Round-trip | |
| --- | --- | --- | --- | --- | --- | --- | --- | --- | --- | --- |
|  | $T_x$ | $R_x$ | $T_x$ | $R_x$ | $T_x$ | $R_x$ | $T_x$ | $R_x$ | $T_x$ | $R_x$ |
| Current route | ❶ | | ❷ | | ❸ | | ❶ | | ❶ | |
| Performance | PCR | $\mu_r$ | PCR | $\mu_r$ | PCR | $\mu_r$ | πPCR | Σ$\mu_r$ | πPCR | R |
| Reality | 80% | 0.25 | 75% | 0.33 | 90% | 0.11 | 54% | 0.69 | 29% | 1.38 |
| Measure | 82% | 0.22 | 74% | 0.35 | 91% | 0.10 | 55% | 0.67 | 29% | 1.34 |
| Alternate route | ❶ | | ❺ | | ❻ | | ❹ | | ❶ | |
| Performance | PCR | $\mu_r$ | PCR | $\mu_r$ | PCR | $\mu_r$ | πPCR | Σ$\mu_r$ | πPCR | R |
| Reality | 80% | 0.25 | 50% | 1 | 90% | 0.11 | 36% | 1.36 | 13% | 2.72 |
| Estimation | 100% | 0 | 90% | 0.11 | 100% | 0 | 90% | 0.11 | 81% | 0.22 |

Note that the estimation for the alternate route (shown in italics on the last row) is erroneous: it estimates that the round-trip packet completion rate is 81%, which corresponds to a metric of M=H+$\mu_R$/2=3+0.22/2=3.11. In reality, the round-trip packet completion rate for this route is actually 13%, which corresponds to a metric of M=H+$\mu_R$/2=3+2.72/2=4.36. These discrepancies are typical of systems which do not have stringent SNR requirements or operate in wide frequency bands that are shared with other types of devices (such as the ISM bands): these systems are not capable of estimating the packet completion rate without sending traffic. It is a purpose of the present invention to circumvent this problem by sending dummy scouting packets along potential routes.

Meanwhile, the measurement for the current route is performed accurately (shown in bold on the sixth row of Table 2). Indeed, the presence of traffic along the route ensures that the measurement is accurate and up-to-date. The current route metric is calculated to be M=H+$\mu_R$/2=3+1.34/2=3.67. This value is close to the actual one (M=H+$\mu_R$/2=3+1.38/2=3.69).

The PCRs for the entire route and the mean number of retries for the actual links are shown only for clarity. They do not need to be calculated.

It appears that the route metric for the alternate route is M=4.36, which is greater than the metric for the current route (M=3.69). The objective of the scouting algorithm is to ensure that the alternate route is not established. The following sequence of events shows how this is performed by using scouting packets.

At time sequence 1, node ● sends and receives traffic to and from node ●; the metric associated with that route (according to equation 3) is M=3.67. Node ● informs node ● of a route to node ● that appears to present a better metric (M=3.11). However, since no traffic is being sent along that route, the metric should appear suspicious. If many alternate routes are offered, it is critical that node ● does not switch routes at every opportunity, or instability might appear in the network. Instead of establishing a route, node will scout the route ● first.

At time sequence 2, node ● sends a scouting packet to node ●, carrying a value of R=0. If the packet is successfully sent, node ● awaits for the scouting packet to return. If the packet is not successfully sent, R is increased by 1 for each unsuccessful attempt.

A time sequence 3, node ● forwards the scouting packet to node ●, carrying R. If the packet is successfully sent, node ● awaits for the scouting packet to return. If the packet is not successfully sent, R is increased by 1 for each unsuccessful attempt.

At time sequence 4, node ● forwards the scouting packet to node ●, carrying R. If the packet is successfully sent, node ● awaits for the scouting packet to return. If the packet is not successfully sent, R is increased by 1 for each unsuccessful attempt.

At time sequence 5, node ● returns the scouting packet to node ●, carrying R. If the packet is successfully sent, node ● no longer processes scouting packets from ●. If the packet is not successfully sent, R is increased by 1 for each unsuccessful attempt.

At time sequence 6, node ● returns the scouting packet to node ●, carrying R. If the packet is successfully sent, node ● no longer processes scouting packets from ●. If the packet is not successfully sent, R is increased by 1 for each unsuccessful attempt.

At time sequence 7, node ● returns the scouting packet to node ●, carrying R. If the packet is successfully sent, node ● no longer processes scouting packets from ●. If the packet is not successfully sent, R is increased by 1 for each unsuccessful attempt.

At time sequence 8, node ● compares the value of $R_{alt}$ in the scouting packet with the value $R_{current}$ that it has computed for its own route to ●($R_{current}$=1.34). If $R_{alt}$ is equal to 0 or 1, node ● will proceed to establishing a route through ● (since $[H+R_{alt}/2]<[H+R_{current}/2]$, otherwise it will maintain its route through ● (since $[H+R_{alt}/2]>[H+R_{current}/2]$).

The probability of there being no retry during the scouting process is equal to:

$$P[R=0]=P[r(1)=0]^2 \cdot P[r(2)=0]^2 \cdot P[r(3)=0]^2 = PCR(1)^2 \cdot PCR(2)^2 \cdot PCR(3)^2 = 13\%$$

The probability of there being one retry during the scouting process is equal to:

$$P[R=1]=2 \cdot P[r(1)=1] \cdot P[r(1)=0]P[r(2)=0]^2 \cdot P[r(3)=0]^2$$
$$+2 \cdot P[r(1)=0]^2 \cdot P[r(2)=1] \cdot P[r(2)=0] \cdot P[r(3)=0]^2 +$$
$$2P[r(1)=0]^2 \cdot P[r(2)=0]^2 P[r(3)=1] \cdot P[r(3)=0]$$
$$=2 \cdot PCR(1)^2 \cdot PCR(2)^2 \cdot PCR(3)^2[3-PCR(1)-PCR(2)-PCR(3)]=20.7\%$$

The probability of error is therefore approximately 33.7% for the example given. To improve the precision, the source node can send multiple scouting packets and average the resulting metric.

Time Dependency

Figure 2:
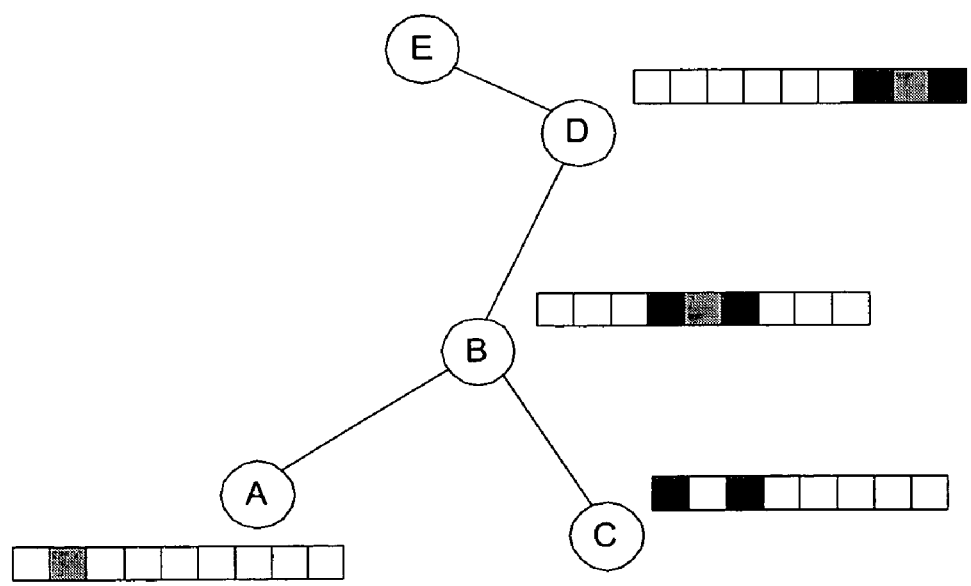
FIG. 2 is a block diagram showing an example of slot allocation via scouting.

In cases where the establishment of a route has time dependencies (for example, if one considers that time slots are being reserved along a route by a TDMA Medium Access Controller), then the scouting packet must be able to activate those events, as shown in FIG. 2. In other words, the scouting packet must act as a routing packet as it pertains to creating routes or reserving slots, but without actually activating them.

Route Instability

The scouting algorithm increases the overhead of one single route establishment. It may therefore appear that the algorithm is less efficient than a basic routing algorithm. This is not true if one considers the fact that routes always appear better when they are not used. Thus, if a node has N possible routes to a destination and all non-established routes appear better than the one that is established, the node will try to establish all possible N routes one after the other.

The consequences of this are:

extreme overhead: route requests are issued one after the other as the cost metric is adjusted to real conditions;

out-of-order packets: packets from a new route might arriver earlier than older packets from a previous route, which is probably more congested than a new route; and poor performance: the system is unable to settle on a route providing acceptable performance and ends up trying all the routes possible instead (most of them being presumably far worse than the best of them).

The scouting packet solves this problem by ensuring that a new route is established only after it has been determined that its actual metric is probably better than the one currently being used.

Scouting provides the same high-quality measurement as a system that permanently tries every single link while minimizing the overhead increase.

An Example of Scouting

In a network running the protocol described in U.S. Patent Application No. 2004/0143842 referenced above, the routing metric to the associated IAP (Intelligent Access Point) is advertised in hello messages which are sent periodically by all the nodes. Although the nodes regularly update their metrics to the associated IAP upon receiving new information (and reflect it in the subsequent hello message), there is a good possibility that the cumulative metrics across multiple hops are inaccurate. This is further illustrated by the following exemplary network.

Figure 3:
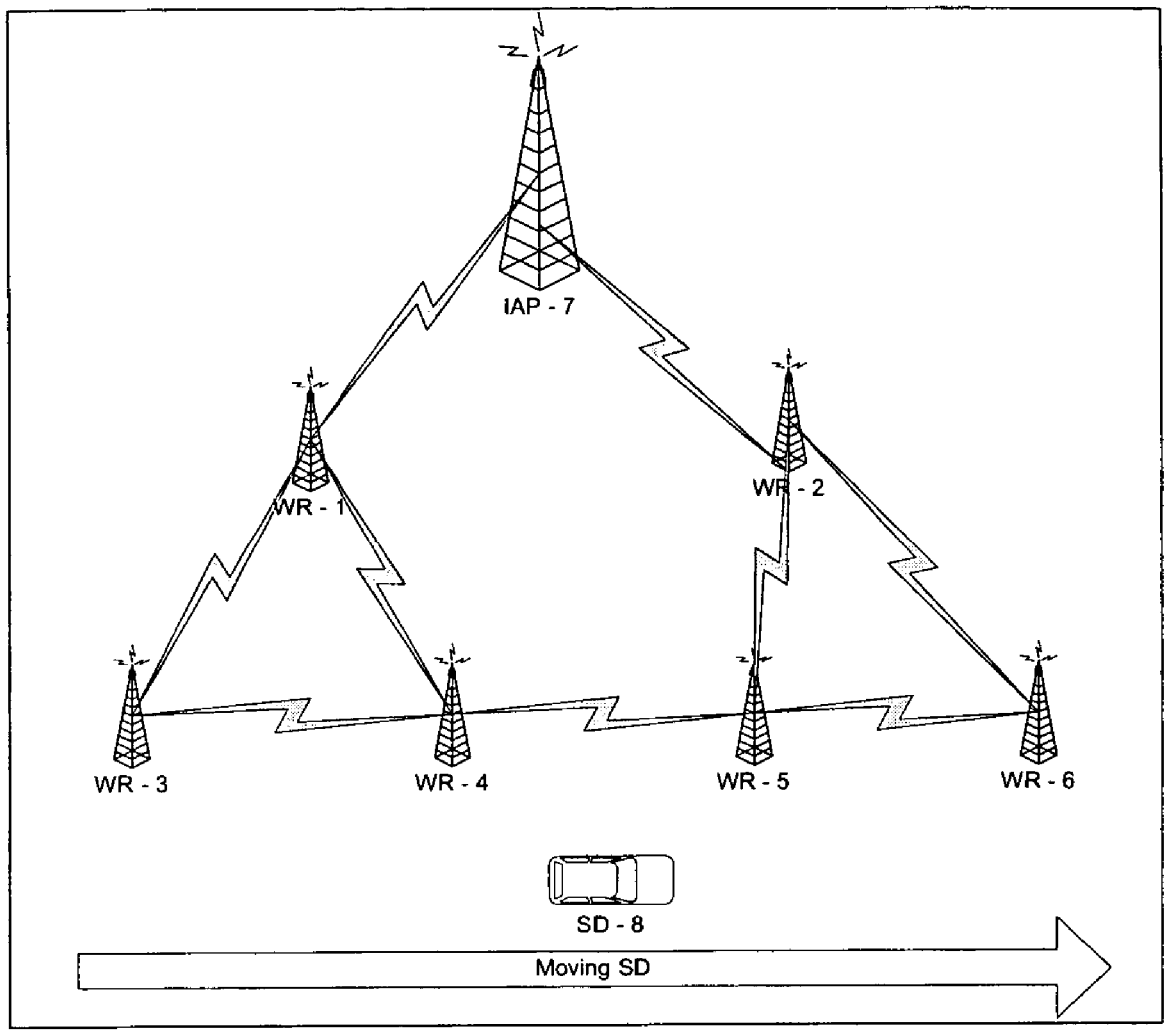
FIG. 3 is a block diagram of an example of a wireless network.

In the network shown in FIG. 3, a subscriber device SD-8 is shown to be moving from the coverage area of wireless routers WR-3 and WR-4 to that of WR-5 and WR-6. It is assumed that SD-8 is using WR-4 for its route to the IAP and the route is SD-8-WR-4-WR-1-IAP-7. SD-8 now receives hello messages from wireless routers WR-5 and WR-6. The subscriber device must decide if it needs to keep the same route or switch to the new routes being advertised by WR-5 and WR-6. Furthermore, if it decides to change the route, it needs to choose between the routes advertised by WR-5 and WR-6. In this scenario, it is assumed that there is some traffic flowing between nodes WR-6/WR-2 and WR-2/IAP-7: this way the metrics advertised by WR-6 are accurate and up-to-date. It is also assumed that no traffic flows between WR-5 and IAP-7 and therefore the metrics advertised by WR-5 are not based on real traffic and are solely based on predictions. Thus, the metrics advertised by WR-5 can be inaccurate especially if WR-5 has missed several hellos (since hellos are broadcast messages and have a low reliability of being received by all the neighbors). If WR-5 is advertising a lower metric than that advertised by WR-6, SD-8 will establish a route through WR-5 only to find that the real metric is worse than the one advertised. This will force SD-8 to pursue another route offering better metrics resulting in network instability and the possibility of out-of-order delivery of packets.

The scouting packets help alleviate the problem depicted in this example: when SD-8 receives multiple hellos from WR-5 and WR-6, it sends one or more scouting packets to find out the real metrics. The scouting packets will traverse the whole route and find the accurate metric associated with the route, as described above under the heading "routing metric precision." SD-8 can now make an informed decision to choose a route offered by WR-6 without destabilizing the network.

In another embodiment, the scouting message can just accumulate the metrics/statistics calculated by the nodes along the route so that the source node gets the real time knowledge of the complete route in place of possibly stale information due to a missed hello message.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method of evaluating a route in a wireless network, comprising:
    operating a node using a current route;
    receiving a trigger suggesting establishment of a suggested route;
    sending at least one scouting packet along the suggested route in response to the received trigger, wherein the scouting packet collects statistics related to the suggested route, without establishing the route while the scouting packet traverses the suggested route;
    comparing at least one metric of the collected statistics related to the suggested route to at least one metric related to the current route; and
    operating the node by establishing the suggested route as a new route when the at least one metric related to the suggested route is preferable to the at least one metric related to the current route.

2. The method of claim 1, wherein the trigger comprises an indication that the suggested route is preferable to a current route.

3. The method of claim 1, wherein the trigger comprises node moving from one coverage area to another coverage area.

4. The method of claim 1, wherein a routing protocol maintains multiple routes to a single destination, the method further comprising:
    periodically sending scouting packets along routes, wherein the scouting packets collect statistics related to the routes.

5. The method of claim 1, wherein at least one scouting packet is a Route Request packet with a special bit set.

6. The method of claim 1, wherein the collected statistics relate to at least one metric related to the suggested route, further comprising:
    updating a metric related to the suggested route.

7. The method of claim 6, further comprising:
    updating the precision of the metric measurement.

8. The method of claim 1, further comprising:
    analyzing the statistics.

9. The method of claim 1, wherein the collected statistics relate to at least one metric related to the route, further comprising:
    deriving a new metric value for scouted links, based on statistics collected during scouting.

10. The method of claim 9, wherein the metric is equal to a total number of transmissions along the route.

11. The method of claim 1, wherein the statistics collected during scouting include number of transmission attempts.

12. The method of claim 11, wherein at least one scouting packet reserves time slots along a route.

13. The method of claim 11, wherein time slots are reserved by a TDMA Medium Access Controller.

14. The method of claim 1, wherein at least one scouting packet ascertains whether time slots are available along a route.

15. The method of claim 1, wherein the scouted route comprises at least two hops.

16. The method of claim 1, wherein the network comprises a single hop network.

17. A method of evaluating a route in a wireless network, comprising:
    receiving a trigger suggesting establishment of a suggested route;
    sending at least one scouting packet along the suggested route in response to the received trigger, wherein the scouting packet collects statistics related to at least one metric related to the suggested route, without establishing the route while the scouting packet traverses the suggested route;
    deriving a new metric value for scouted links, based on statistics collected during scouting, wherein a total number of transmissions M along the suggested route is derived from a number of round-trip retries R and a number of hops H according to the following equation: $M=H+R/2$.

* * * * *

UNITED STATES PATENT AND TRADEMARK OFFICE
CERTIFICATE OF CORRECTION

| | |
|---|---|
| PATENT NO. | : 7,512,074 B2 |
| APPLICATION NO. | : 10/986698 |
| DATED | : March 31, 2009 |
| INVENTOR(S) | : Strutt et al. |

It is certified that error appears in the above-identified patent and that said Letters Patent is hereby corrected as shown below:

ON THE TITLE PAGE

On Page 2, in item (56), References Cited, under "OTHER PUBLICATIONS", in Column 1, Line 6, delete "Artifical" and insert -- Artificial --, therefor.

IN THE SPECIFICATION

In Column 1, Line 48, after "6,807,165" insert -- entitled --.

In Column 8, Line 1, delete "
$$P[R=1]=2 \cdot P[r(1)=1] \cdot P[r(1)=0]P[r(2)=0]^2 \cdot P[r(3)=0]^2$$
$$+2 \cdot P[r(1)=0]^2 \cdot P[r(2)=1] \cdot P[r(2)=0] \cdot P[r(3)=0]^2+$$
$$2P[r(1)=0]^2 \cdot P[r(2)=0]^2 P[r(3)=1] \cdot P[r(3)=0]$$
$$=2 \cdot PCR(1)^2 \cdot PCR(2)^2 \cdot PCR(3)^2[3-PCR(1)-PCR(2)-PCR(3)]=20.7\%$$
"

and insert --
$$P[R=1]=2 \cdot P[r(1)=1] \cdot P[r(1)=0] \cdot P[r(2)=0]^2 \cdot P[r(3)=0]^2$$
$$+2 \cdot P[r(1)=0]^2 \cdot P[r(2)=1] \cdot P[r(2)=0] \cdot P[r(3)=0]^2+$$
$$2 \cdot P[r(1)=0]^2 \cdot P[r(2)=0]^2 P[r(3)=1] \cdot P[r(3)=0]$$
$$=2 \cdot PCR(1)^2 \cdot PCR(2)^2 \cdot PCR(3)^2 \cdot [3-PCR(1)-PCR(2)-PCR(3)]=20.7\%$$
--, therefor.

IN THE CLAIMS

In Column 10, Line 1, in Claim 3, after "comprises" insert -- the --.

Signed and Sealed this
Sixth Day of September, 2011

David J. Kappos
*Director of the United States Patent and Trademark Office*

UNITED STATES PATENT AND TRADEMARK OFFICE
CERTIFICATE OF CORRECTION

PATENT NO. : 7,512,074 B2
APPLICATION NO. : 10/986698
DATED : March 31, 2009
INVENTOR(S) : Strutt et al.

It is certified that error appears in the above-identified patent and that said Letters Patent is hereby corrected as shown below:

ON THE COVER PAGE, at Assignee: Please delete "Motorola, Inc., Schaumburg, IL" and insert therefor --MeshNetworks, Inc., Maitland, Florida--.

Signed and Sealed this
Third Day of July, 2012

David J. Kappos
*Director of the United States Patent and Trademark Office*